UNITED STATES PATENT OFFICE 2,557,942

1,3-SUBSTITUTED 1,1,3,3-TETRACHLORO 1,3-DISILAPROPANE

Harold A. Clark, Midland, Mich., assignor to Dow Corning Corporation, Midland, Mich., a corporation of Michigan No Drawing. Application March 19, 1949, Serial No. 82,471

5 Claims. (Cl. 260—448.2)

The present invention relates to the production of new organosilicon compounds and to the fluids so produced.

The present organosilicon industry is based upon siloxanes which are materials in which the silicon atoms are linked through oxygen atoms. Another type of compound is one in which the silicon atoms are linked directly to each other. Still a third type is one in which the silicon atoms are linked by organic radicals. The literature presents very little information on this last type of compound.

One object of the present invention is to produce organosilicon compounds in which the silicon atoms are linked by methylene radicals. Still other objects and advantages of the present invention will be apparent from the following description.

The compounds hereof are of the type $Y_2RSiCH_2SiRY_2$ where each R represents a hydrocarbon radical of the group consisting of alkyl radicals such as methyl to octadecyl and monocyclic aryl radicals, such as phenyl, tolyl and xylyl, and each Y represents a substituent of the group consisting of alkoxyl and halogen preferably ethoxyl, chlorine or bromine. These compounds are of the types $$Y_2C_6H_5SiCH_2SiCH_3Y_2,$$

$$Y_2CH_3SiCH_2SiCH_3Y_2 \text{ and } Y_2C_6H_5SiCH_2SiC_6H_5Y_2.$$

The present compounds may be prepared by reacting a compound of the type $X_2RSiCH_2SiX_3$ with a Grignard reagent of the type RMgX. In the above type formulae each X represents a halogen atom and each R represents an alkyl or a monocyclic aryl radical. The intermediate compound $X_2RSiCH_2SiX_3$ is disclosed in 70 JACS 3590, at page 3593.

In the Grignard coupling reaction, the Grignard reagent is used in amount of from 0.5 and 1.5 mols per mol of $X_2RSiCH_2SiX_3$ whereby to replace one of the halogens with alkyl or monocyclic aryl radicals.

The products of the present invention are of utility as water-proofing agents. The products hereof are also of substantial importance as intermediates in the production of other organosilicon products. Thus, upon hydrolysis and condensation, products are obtained which contain both methylene and siloxane bridges between the silicon atoms. These are of use for preventing foaming in aqueous and non-aqueous systems containing organic materials.

Example 1

When methyl Grignard reagent, $CH_3MgBr$, in amount of 119 parts in ether solution is gradually added to 262.5 parts of $Cl_2CH_3SiCH_2SiCl_3$, a coupling reaction occurs. The reactants are cooled, the products filtered, and the ether is removed in a stripping still. The product $$Cl_2CH_3SiCH_2SiCH_3Cl_2,$$

may be separated by distillation. This product has a boiling point of 192° C. at atmospheric pressure and a density of 1.288 at 25° C.

A mixture of 242 parts of this product, $Cl_2CH_3SiCH_2SiCH_3Cl_2$ and 47.8 parts of $$C_6H_5CH_3SiCl_2$$

in 310 parts of toluene was added to 699 parts of $H_2O$ over a period of one-half hour at 5°–28° C. 190 parts of toluene were then added to make 25% resin solids in toluene solution. The resin was washed 4 times with 50° C. water and 3 times with cold $H_2O$. Then, the toluene was stripped from the resin. The resin cures in less than one hour at 150° C. The resin also maintained satisfactory flex for longer than 165 hours at 250° C.

Example 2

1410 parts by weight of phenyl Grignard reagent, $C_6H_5MgBr$, in ether solution was added to 1312.5 parts of $Cl_3SiCH_2SiCl_2CH_3$ and the mixture added to 1100 parts of toluene. The reactants were cooled, the products filtered, and the ether removed in a stripping still. 387 parts of the product, $C_6H_5Cl_2SiCH_2SiCl_2CH_3$, was separated by distillation. This compound was found to have a boiling point of 148.5° C. at 13 mm., a refractive index of 1.5290 at 25° C., a density of 1.313 at 25° C., and a specific refraction of 0.3084.

That which is claimed is:

1. Compositions of the general formula $$Cl_2RSiCH_2SiCH_3Cl_2$$

in which R represents a radical of the group consisting of alkyl and monocyclic aryl radicals.

2. $Cl_2C_6H_5SiCH_2SiCH_3Cl_2$
3. $Cl_2CH_3SiCH_2SiCH_3Cl_2$
4. The method which comprises reacting a compound of the type $Cl_2CH_3SiCH_2SiCl_3$ in liquid phase with a compound of the type RMgX in which R represents a radical of the class consisting of alkyl and monocyclic aryl radicals and X represents a halogen atom, the latter compound being employed in proportion between 0.5 and 1.5 mols per mol of the former, whereby a product of the formula $Cl_2CH_3SiCH_2SiRCl_2$ is obtained.

5. The method in accordance with claim 4 in which R represents methyl.

HAROLD A. CLARK.

REFERENCES CITED

The following references are of record in the file of this patent:

Goodwin: "Jour. Am. Chem. Soc."; vol. 69, page 2247.

Bluestein: "Jour. Am. Chem. Soc."; vol. 70, pages 3068–3071.

Sauer et al.: "Jour. Am. Chem. Soc."; vol. 70 (1948) pages 3590–3596.